INVENTOR
ROBERT E. WALKER
By Frederick C. Bromley
ATTY.

May 6, 1958  R. E. WALKER  2,833,109
HAY BALE STOOKER

Filed Oct. 10, 1955  2 Sheets-Sheet 2

INVENTOR
ROBERT E. WALKER
By Frederick E. Bromley
ATTY

2,833,109
HAY BALE STOOKER
Robert E. Walker, Port Perry, Ontario, Canada
Application October 10, 1955, Serial No. 539,556
6 Claims. (Cl. 56—473.5)

My invention relates to improvements in stookers for hay balers, and particularly to a novel construction and arrangement of a stooker by which bales can be stooked in a highly advantageous manner as they are discharged from a baler.

According to the invention there is provided a stooker adapted to be hitched behind a conventional baler to receive bales as they are discharged from the baler. The bales are manually placed upon the stooker to form a cottage type stook that is a stook resembling a thatched roof of an old fashioned cottage. The stooker is operated by a lever to deposit the stook upon the ground.

A general object of the invention is to provide an improved stooker of the kind referred to which is comparatively simple in construction and easy to manipulate.

A further object is to provide a stooker adapted to be drawn over the land by a hitch connection with a conventional baler and embodying a movable platform which is designed to be lowered from a loading position to a depositing position, and which is supplied with an arrangement of longitudinally directed apertured slots receptive to longitudinal corners of bales. According to this arrangement the bales are placed in stooked formation on the platform in a cottage type of stook. In the lowering of the movable platform the stook formation is preserved and therefore the bales are stooked in this cottage type of stook.

A further object is to produce a stooker of this class in which the body of the stooker is a vehicular framework including runners or skids for traversing the land, and one in which there is a stationary platform on which a person may stand while handling bales to properly place them on the movable platform as they leave the baler.

A still further object is to provide a stooker of the kind referred to in which the movable platform is moved by a parallel motion mechanism controlled by lever mechanism.

A highly important feature of the stooker is that it provides a movable platform in the form of a fork of which the bifurcations are open rearwardly so that when the loaded platform is lowered the lower bales of the stook come into contact with the ground and relieve the platform of the weight of the bales which allows the forked platform to readily withdraw in the progressional movement of the stooker. When the platform is cleared the operator can shift an actuating lever with ease for restoring the platform to its normal raised position.

A selected embodiment of the invention is shown in the accompanying drawings, in which.

Figure 1:
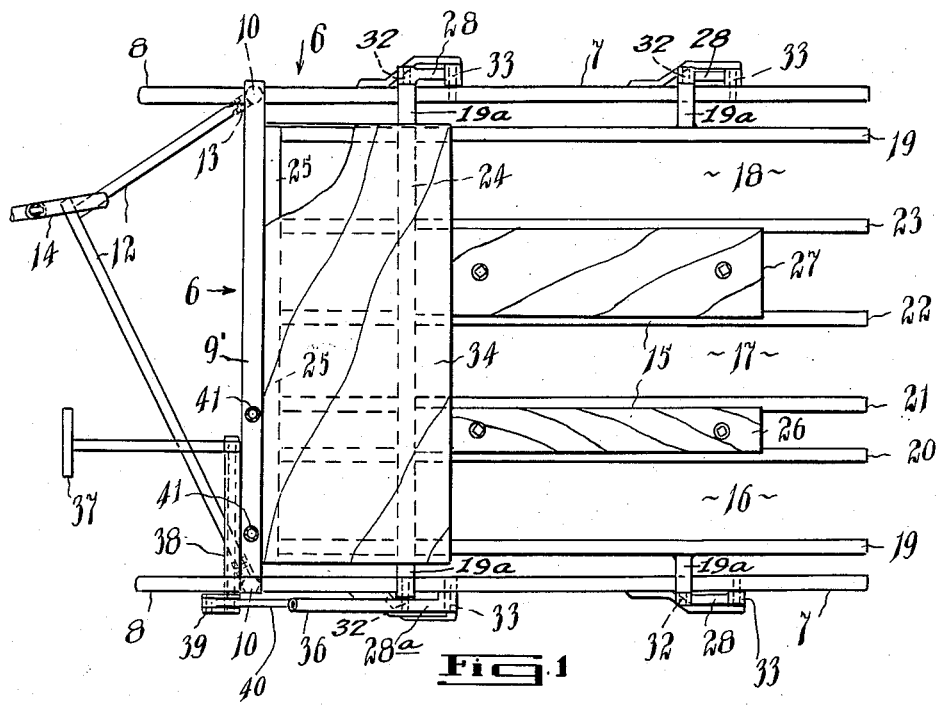
Fig. 1 is a plan view, with parts broken away, of the stooker and showing the load receiving platform in normal position.
Figure 2:
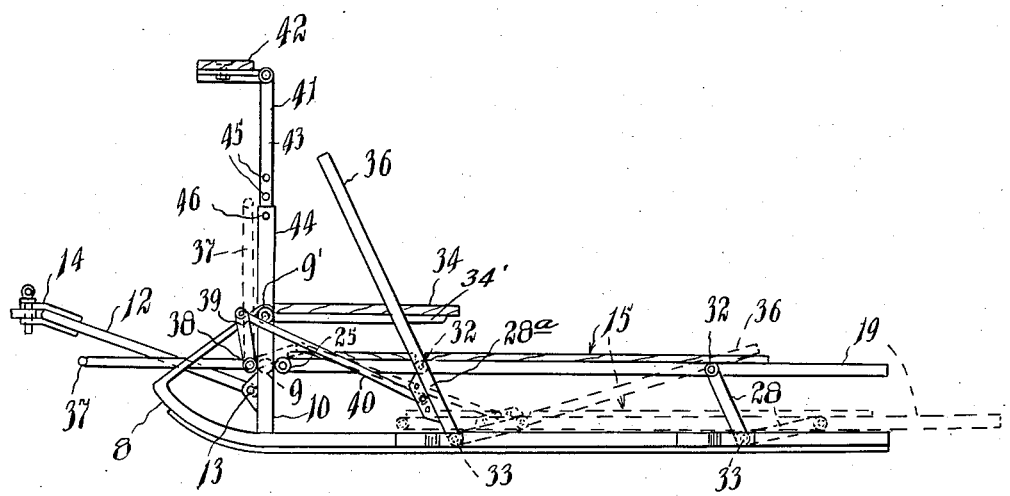
Fig. 2 is a side elevation thereof.
Figure 5:
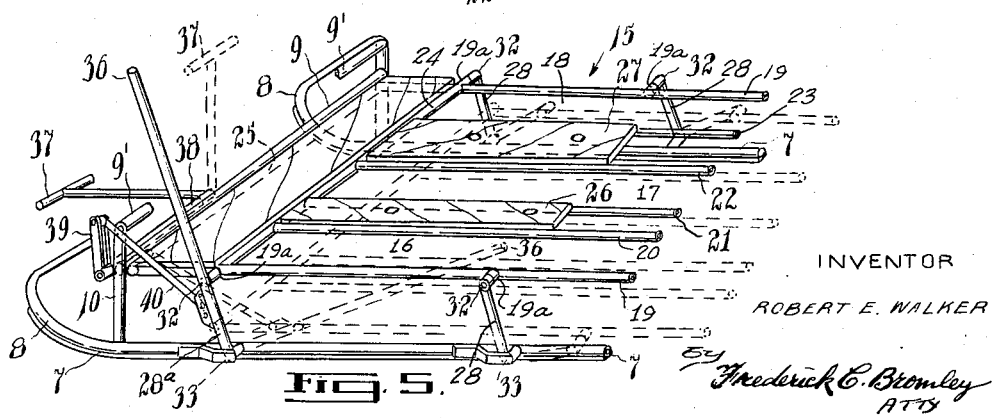
Fig. 5 is a perspective view of the stooker depicting the movable platform in raised position in solid lines and in lowered position in dash lines.

The stooker comprises a U-form vehicular body defining framework generally indicated at 6 and comprising a pair of laterally spaced runners 7 having upturned front ends 8 which are tied together in approved manner. Preferably the forward ends of the runners 7 are connected together by lower and upper crossbars 9 and 9' made fast to uprights 10 which latter connect runner portions 7, 8, as shown in Figs. 1, 2 and 5. The structure of the frame is strengthened by struts 11 connecting the frontal crossbars 9 and 9' at intervals. The cross bars 9, 9' and connecting struts 11 constitute a sturdy frontal cross member structure for the U-form vehicular body-defining framework 6, the rear end of which is open as shown in Fig. 1.

This framework 6, as will be understood, forms the body of the vehicle which is drawn over the ground behind a conventional baler. For this purpose the stooker is hitched to the baler by a hitch 12 formed of connected bars pivoted at 13 and supplied with a coupling device 14 of a known type.

Mounted on the framework 6 is a movable platform 15 comprising a frame of bars providing a bifurcated arrangement including longitudinally extending rearwardly open, slots 16, 17 and 18. The movable platform 15 is a load-receiving platform upon which the bales 35 are placed by an operator as they are discharged from the baler. The movable platform 15 is made up of the side bars 19, the two sets of laterally spaced inner bars 20, 21, and 22, 23; all of which are rigidly joined, by welding, or otherwise, to the laterally spaced frontal crossbars 24 and 25. The space between bars 20, 21 is bridged by a plank 26 to a point adjacent the rear end of platform 15; likewise the space between bars 22 and 23 is similarly bridged by a plank or the like 27 to a point adjacent the rear platform end. This arrangement of the platform structure provides the three longitudinal slots 16, 17 and 18, which extend in parallel relation between the respective pairs of bars 19, 20; 21, 22 and 23, 19 and are open at the rear ends.

The movable platform 15 is supported in a normally raised position by pivoted arms 28, 28a extending in a general upright attitude and inclined slightly forwardly past a dead centre position. It is to be noted that the upper end of arm 28a has a hand lever extension 36 and that the arms 28, 28a are pivoted at their upper ends to the respective side bars 19, as at 32, and also pivoted at their lower ends, as at 33, to the runners 7. In the raised forwardly shifted position of said movable platform 15 (see Figs. 2 and 5) the crossbar 25 thereof is in supported abutment with the lower crossbar 9 of vehicular frame 6. Thus further forward movement of the arms 28, 28a and platform 15 is prohibited, but said arms 28, 28a are free to swing rearwardly. Accordingly the movable platform 15 is normally maintained in the raised position shown in full lines in Figs. 2 and 5. The arms 28, 28a form a parallel-movement mechanism and are capable of swinging rearwardly and downwardly to lower the platform 15 with a parallel motion. In lowered position the platform 15 comes to rest on the runners 7, being supported thereon by the outer portions of frontal crossbar 24 and by the laterally extending bearing-carrying extensions 19a of side bars 19, as indicated in Figs. 1 and 4.

A stationary platform 34 is arranged at the front end of the framework 6 to extend across and above the movable platform 15. The stationary platform is secured to the upper crossbar 9' by means of rearwardly extending supporting bars 34' (see Figs. 2, 3 and 4) whose front ends are functionally integral with the top cross bar 9' of frame 6. An operator stands on the stationary platform 36 while he places bales on the movable platform to form a cottage type of stook using six bales (see Figure 3). The operator subsequently lowers the movable platform 15 to deposit the stook-forming bales on the ground, and then raises the movable platform to repeat the stooking process from time to time as required in the operation of baling hay.

Figure 3:
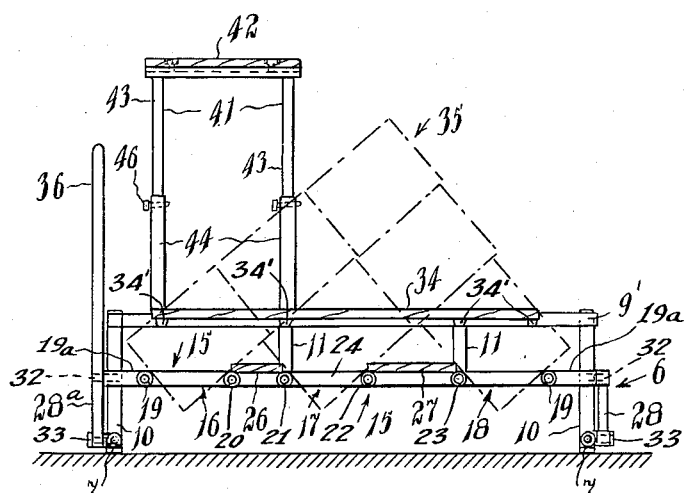
Fig. 3 is a rear end view of Fig. 2.
Figure 4:
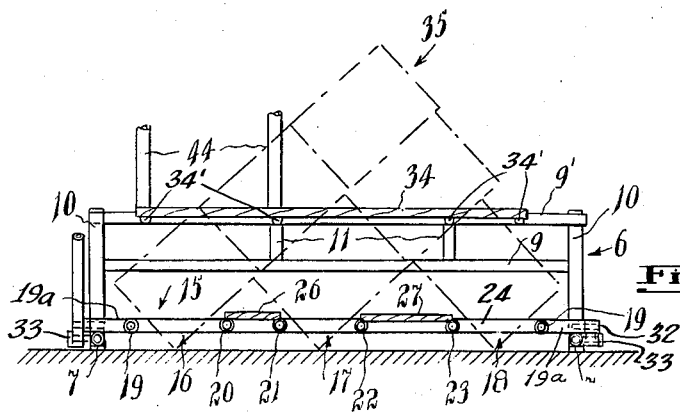
Fig. 4 is a further rear end view of the stooker but showing the movable platform in lowered position.

The formation of the cottage stook is clearly depicted in Figs. 3 and 4. It will be observed that the bales are placed lengthwise on the platform and that a bale is angularly lodged in each of the three slots 16, 17, and 18, with a longitudinal edge projecting downwardly below the platform. Three bales are placed upon the lower bales to complete the cottage type of stook. The bales are designated at 35 and are delineated in dot and dash lines. The bales are lowered by means of the platform 15 to rest on the ground in their pre-stooked formation, which is accomplished by lowering the movable platform 15 while the stooker is being drawn along by the baler. In the lowering operation the platform remains horizontal to avoid capsizing the stacked bales. It subsequently withdraws from the stook and is raised by the operator for a repeat operation. The stook is very stable and provides ample air space for good curing. The bales are satisfactory set off in windrows in this manner and an advantageous feature is that all six bales of the stook can be loaded simultaneously by using a conventional front end loader with a four-tine fitting.

A tripping device of the manual type is used for effecting the lowering of the platform 15 when fully loaded (Fig. 3). The tripping device preferably comprises the previously mentioned hand lever 36 which is formed as a continuation of pivoted arm 28a which is forwardly located as shown. The hand lever extension 36 of platform supporting arm 28a is situated conveniently to the operator, and it is only necessary to move it rearwardly to throw the arms 28, 28a rearwardly past dead-centre position in order to lower the platform 15 so that the bales thereon come to rest upon the ground in stooked formation.

A foot lever is preferably used to raise the platform 15 after a lowering operation. This is shown as comprising a pedal 37 which is fast on a shaft 37a which is journalled as at 38 to the crossbar 9 the other end of said shaft 37a being supplied with a crank arm 39. A pitman 40, or the like, is used to link this crank arm 39 to the arm portion 28a of the hand lever 36. A hand rail is provided for the operator. This is shown as comprising a pair of posts 41 rigidly upstanding from the front end of the framework or body of the stooker. The upper ends of the posts are connected by a rail element 42 which can be grasped by the operator to steady himself at any time as when depressing the pedal 37 to raise the platform 15. The hand rail can be set at different elevations, and to this end the posts are made of telescopic parts 43, 44, and supplied with holes 45 for a locking pin 46.

The advantages and utility of the stooker will be clearly evident from the preceding description and it will be understood that such changes and modifications may be resorted to as fairly come within the scope of the appended claims.

What I claim is:

1. A stooker adapted to receive bales from such as a traveling baler and for depositing same on the ground in "ridged roof"-simulating stacks which expose up to at least as many as three superposed bales from each side with the lowermost bales in edge contact only with the ground, said stooker comprising a frame-like substantially U-form vehicular body which is open at its rear end, laterally spaced ground-adjacent runners constituting opposite sides of said vehicular body and providing upturned forward portions, upstanding members connecting the respective runners with the related upturned forward portions, a frontal body end-providing and runner-connecting cross member structure providing upper and lower portions which are spaced above the plane of said runners, a fixed rearwardly extending attendant-supporting platform functionally integral with the upper portion of said frontal cross member structure and spacedly overlying a part of the forward portion only of the length of the space between said runners, a vertically and rectilineally shiftable bale stack-supporting platform, a plurality of runner-carried supporting arms for said shiftable platform at opposite sides of the latter and spaced in the direction of the length of said runners, each of said arms transversely pivoted at longitudinally spaced points to said platform and runners, whereby to control movement of said shiftable platform in parallelism with said runners from a forwardly located elevated position to its lowermost rearwardly located position adjacent the runners, whereby to avoid capsizing a stack during such platform movement, said shiftable platform having rearwardly open laterally spaced runner-paralleling slots for the projection of bale corners therethrough whereby a bale stack will be ground supported when the shiftable platform is in its aforementioned lowermost position, and the lower portion of said frontal runner-connecting cross member structure being positioned to intercept the forward end of said shiftable bale platform after the arms have swung predeterminedly forward past vertical dead center position with respect to their runner carried pivots, whereby to cooperate with said arms in the support of the bale platform in its elevated bale-receiving position below the plane of said fixed platform.

2. The structure of claim 1, and lever-incorporating means adjacent said fixed platform and operatively connected to one of the bale plateform-supporting arms for actuating the bale platform from one position to another, and the bale platform having runner-overlying side projections to which said arms are pivoted and which projections rest on the runners when the bale platform is lowered.

3. The structure of claim 1, and a forwardly located one of said bale frame-supporting arms adjacent said fixed platform having a rigidly connected lever form extension operable from the fixed platform to actuate the shiftable platform to its lowered position.

4. The structure of claim 1, and a foot lever pivoted to said runner connecting cross member structure, and lever-incorporating means operatively connected to said foot lever and to one of said bale platform supporting arms for returning the bale platform from lowered to elevated position, the foot lever being accessible to an attendant on said fixed platform when the shiftable platform is in lowered position.

5. The structure of claim 1, and a forwardly located one of said bale frame-supporting arms adjacent said fixed platform having a rigidly connected lever form extension operable from the fixed platform to actuate the shiftable platform to its lowered position, a foot lever pivoted to said runner connecting cross member structure, and lever-incorporating means operatively connected to said foot lever and to one of said bale platform supporting arms for returning the bale platform from lowered to elevated position, the foot lever being accessible to an attendant on said fixed platform when the shiftable platform is in its lowered position.

6. The structure of claim 1, and a forwardly located one of said bale frame-supporting arms adjacent said fixed platform having a rigidly connected lever form extension operable from the fixed platform to actuate the shiftable platform to its lowered position, and a foot lever pivoted to said runner connecting cross member structure, lever-incorporating means operatively connected to said foot lever and to one of said bale platform supporting arms for returning the bale platform from lowered to elevated position, the foot lever being accessible to an attendant on said fixed platform when the shiftable platform is in its lowered position, said lever extension and foot lever being located adjacent the same end of said fixed platform, and an elevated hand rail rigidly supported by said runner-connecting cross member structure to extend above the plane of said fixed platform and adjacent the last-mentioned end thereof so that an attendant can steady himself while actuating the shiftable platform from one position to another.

References Cited in the file of this patent

UNITED STATES PATENTS

| | | |
|---|---|---|
| 1,488,540 | Harter | Apr. 1, 1924 |
| 1,529,032 | Meisner et al. | Mar. 10, 1925 |
| 2,648,945 | Harrington | Aug. 18, 1953 |
| 2,740,250 | Olson et al. | Apr. 3, 1956 |